Dec. 15, 1953   F. W. MOFFETT, JR   2,662,489
APPARATUS FOR CONVERTING FROZEN BEVERAGES
FROM A HARD STATE INTO A LIQUID STATE
Filed Dec. 6, 1951

INVENTOR.
FRANK WESLEY MOFFETT, JR.
BY Harold E. Stonebraker,
his ATTORNEY

Patented Dec. 15, 1953

2,662,489

UNITED STATES PATENT OFFICE 2,662,489

APPARATUS FOR CONVERTING FROZEN BEVERAGES FROM A HARD STATE INTO A LIQUID STATE

Frank Wesley Moffett, Jr., Chili, N. Y.

Application December 6, 1951, Serial No. 260,245

6 Claims. (Cl. 107—32)

This invention relates to apparatus for converting a frozen beverage such as milk shake from a hard state into a liquid state while confined in a paper or cardboard cup, and has for its purpose to afford practical and efficient means for quickly reducing a hard frozen mass into a liquid state while in the original package or conventional tapered cup in which it may be frozen.

The usual practice in producing milk shake is to add milk and ice cream to suitable flavoring after which the mixture is agitated or stirred for a minute or two before serving. This procedure requires considerable time in the stirring operation, also in measuring the milk, ice cream, and syrup for each drink, and if these constituents are not in proper proportions, the drink is not satisfactory, and it is a purpose of the invention to enable producing milk shake or other beverages in large volume, packaging the beverage in cardboard or paper cups in which they are served to a customer, and freezing the beverage in the cups which can be stored and the beverage readily dispensed therefrom by converting the frozen mass into a liquid state when required to be served, and it is a purpose of the invention to provide apparatus which is not costly to construct or maintain and which can be operated economically and efficiently to convert a beverage quickly and easily from a hard frozen state into a liquid state ready for immediate consumption, thus enabling a retail dispenser to stock a large quantity of frozen beverage in cups ready for serving to customers as soon as the contents of the cup is converted into liquid form.

A more particular purpose of the invention is to afford a structure adapted for use with conventional paper or cardboard cups such as employed for dispensing milk shakes and similar beverages and for supporting the cup so that its frozen contents can readily be operated upon by mechanical pressure for conversion into liquid form without fracturing or damaging the paper cup.

Still a further object of the invention is to afford a structure including a fixed hollow plunger, and a hollow cover attachable to a frozen milk shake package and cup and so constructed that when reciprocated with a support on which the cup is mounted, the cup and hollow cover are alternately brought into nested relation with the fixed hollow plunger as a result of which the frozen contents of the cup are forced alternately through openings in the plunger to opposite sides thereof, thus resulting in breaking the frozen mass into separate individual portions and thereafter intermingling such separate portions until they are thoroughly plasticized and liquefied to the desired degree.

An additional purpose of the invention is to afford a fixed tapered plunger including a perforate wall and a cooperating reciprocatory cover for the beverage cup having inner and outer portions movable along opposite surfaces of the perforate wall so that the perforate wall of the plunger extends between inner and outer portions of the cover when the latter is in its lowermost position, the cover being movable upwardly away from the plunger which is below the cover and embracing the inner surface of the tapered cup when the cover and cup are in their uppermost positions.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation of a mechanism constructed in accordance with a preferred embodiment of the invention, showing the vertically movable support in its lowermost position with a frozen beverage package indicated in dotted lines on the support and the clamping elements for the cover out of operative position, previously to the support and cup being moved upwardly into operative relation with the cover;

Figure 2:
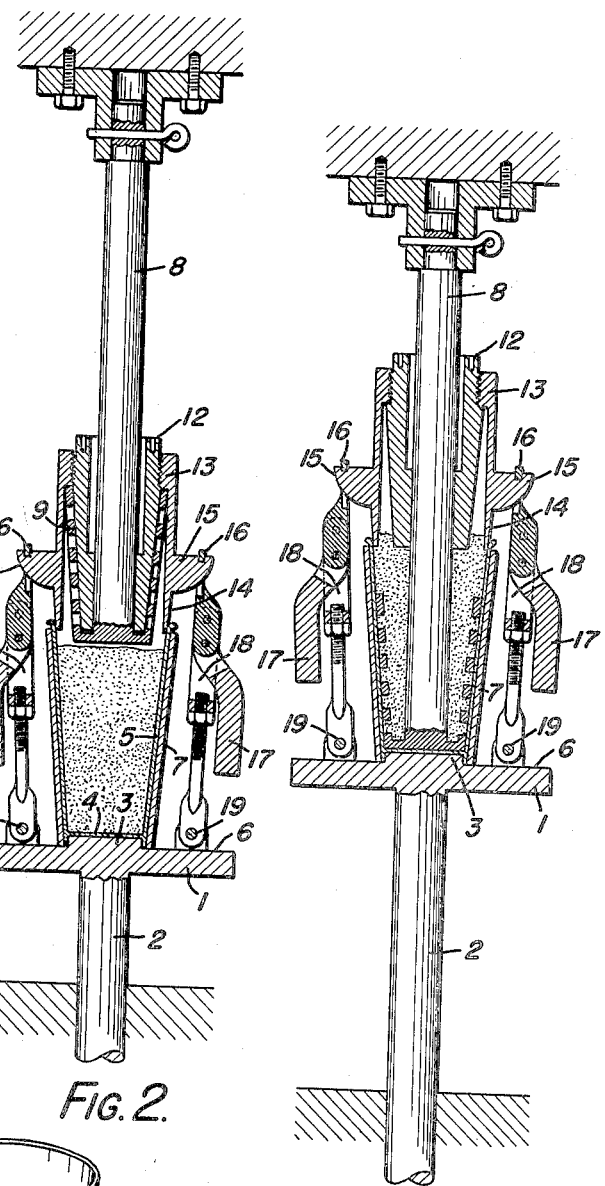
Fig. 2 is an enlarged vertical sectional view taken centrally and showing the position of the parts when the support and cup have been moved upwardly into operative relationship with the cover and the cover clamped to the cup and support, the latter appearing in their lowered positions in relation to the plunger.

The invention is in the nature of an improvement on the structure disclosed in application Serial No. 219,698, filed April 6, 1951, and is designed to enable packaging beverages such as milk shakes in paper or cardboard cups in which they are served and freezing the contents to a low temperature, such that they can be stored or transported indefinitely and maintained in a cold cabinet until ready for serving. For this purpose it is only necessary to place the frozen beverage package in the machine forming the subject matter of the invention and subject it for a few seconds to mechanical pressure operations that quickly break up the frozen contents of the cup and intermingle them until they are in a plastic or liquid form ready to be served in the original cup in which they are packaged, and referring more particularly to the drawings in which like reference numerals refer to the same parts throughout the several views, 1 designates a vertically reciprocatory support mounted upon a rod 2 and including an upraised central portion 3 upon which rests the bottom 4 of a conventional cup made of paper or cardboard and including a tapered side wall 5 that extends downwardly beyond the bottom 4 and embraces, or rests upon the shoulder 6 of the support 1, while 7 designates a tapered container of metal or other rigid material that is removable from the support 1 and positionable thereon to receive the frozen beverage package and tapered cup, as shown in Fig. 2, to prevent expansion or fracture of the cup when the pressure operations are applied to its contents. The support 1 is moved vertically or reciprocated by any suitable fluid pressure or other conventional means controlled by manual or automatic devices to move or to reciprocate the support, all of which forms no part of the invention and is therefore not shown.

Figure 3:
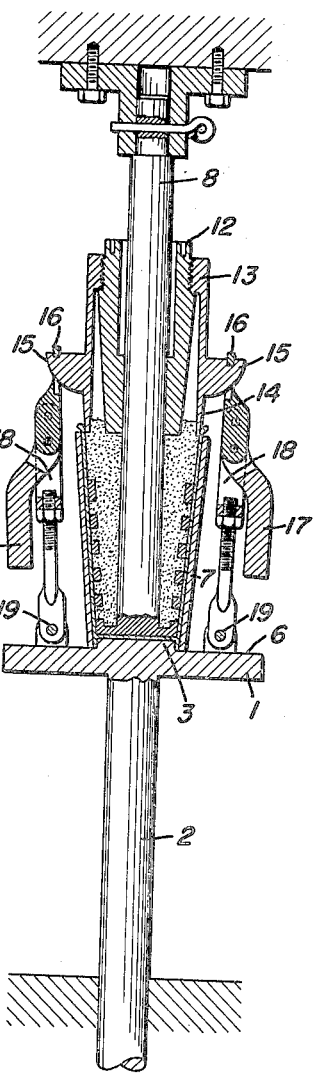
Fig. 3 is a similar view showing the position of the parts when the support and cup with its frozen contents have been moved to their uppermost position in relation to the plunger, the frozen contents having passed through the perforate wall of the plunger to the interior thereof and the perforate wall being then in contact with the inner surface of the tapered cup.
Figure 5:
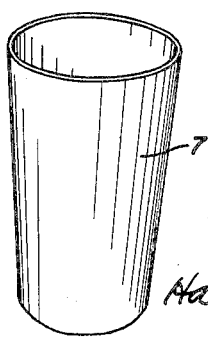
Fig. 5 is a detail perspective view of the container in which the paper or cardboard cup is mounted.

The taper of the container 7 is the same as the taper of the cup and in order to effect the necessary breaking up and intermingling of the portions of the frozen contents of the cup as the latter is moved upwardly and downwardly with the support 1, there is provided a fixed hollow plunger mounted at the bottom of a post 8 which is secured in any suitable manner to a stationary part of the machine, and the fixed hollow plunger includes a perforate wall 9 that is tapered to the same degree as the tapered cup so as to fit within the latter when they are brought into nested relation, it being understood that the frozen contents of the tapered cup are forced alternately in opposite directions through openings 11 in the tapered wall of the hollow perforate plunger. This is accomplished by a cover that is attached to the support and frozen beverage package, and which effects movement of the frozen body through the perforate wall of the plunger when the support and cover are moved downwardly from the position shown in Fig. 3 to the position shown in Fig. 2.

To this end, the cover includes a central body portion 12 that is slidable vertically on the post 8 and has an outer tapered periphery that nests within the perforate wall of the hollow plunger when the cover is in its lowermost position as in Fig. 2. Carried by the central tapered body portion 12 and attached thereto in any suitable fashion as by threading thereon at its upper end is an outer cylindrical portion 13 spaced from the outer periphery of the central portion 12 and having a bottom portion 14 that is engageable inside the paper cup and container 7 at the upper edge of the paper cup, and in order to hold the cover engaged with the paper cup, there are provided laterally extending arms or extensions 15 on the cover which are engaged by clamping elements 16 pivotally mounted upon operating levers 17 which in turn are pivoted to the links 18 that are adjustably and pivotally mounted on the support 1 at 19.

Figure 1:
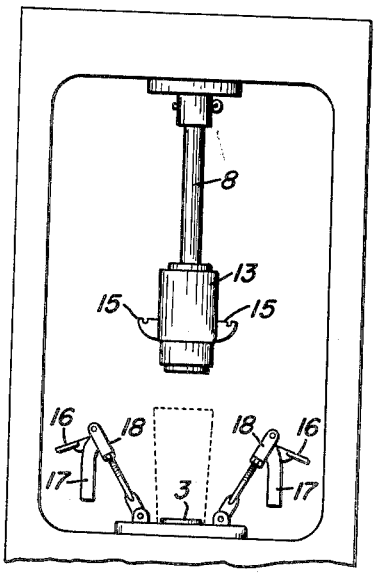
Figure 4:
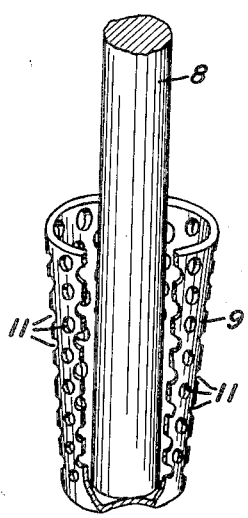
Fig. 4 is a perspective view partially in section of the hollow plunger and the post on which it is mounted.

The operation of the mechanism briefly is as follows: Milk shake containing flavoring syrup, milk, and ice cream, or any other suitable beverage, is premixed and frozen to a hard state within a paper cup 5, in which it can be shipped and kept indefinitely with any suitable protective covering thereon until ready for serving, at which time the covering is removed and the cup with its frozen contents placed within the tapered container 7 and arranged on the support 1 in the manner shown in dotted lines in Fig. 1. The bottom of the cup 4 rests on and embraces the central raised portion 3 of the support and the cup is maintained within the tapered container 7 which protects the cup against lateral expansion or fracture during the subsequent pressure operations. Following this, the cup with its frozen contents and the support 1 are elevated by suitable manual control means, not shown, until the inner surface of the upper edge of the cup engages the outer surface of the bottom edge of the lower portion 14 of the cover, following which the clamping element 16 are are swung upwardly and inwardly to engage the upper surfaces of the arms 15, and the levers 17 are then swung downwardly to clamp the cover in tight engagement with the cup 4 and its surrounding container 7. When the parts are in this position, as illustrated in Fig. 2, the support is moved upwardly by suitable automatic mechanism, and during such upward movement, the frozen contents of the cup 5 is forced through the openings 11 in the perforate wall of the plunger to the interior thereof until the parts reach the position illustrated in Fig. 3, in which the support and cup have moved upwardly until the inner surface and bottom of the cup engage the outer surface and bottom of the plunger and the frozen contents have been forced to the interior of the plunger. At this time the direction of movement of the support and cup is reversed by conventional automatic reversing mechanism, not shown and which forms no part of the invention, and the support and cup move downwardly until they are again in the position illustrated in Fig. 2. This cycle of movements continues for as many reciprocations of the support and cup as desired to bring the contents to a plastic or liquid state, whereupon movement of the support and cup is stopped when the latter are in their downward position, as in Fig. 2. The clamping devices 16 are then released from engagement with the cover, the support and cup lowered away from the cover and plunger, and the cup with its contents in plastic or liquid form is then removed from the surrounding container 7 and is ready to be served.

While the invention has been described in relation to the structure disclosed herein, it is not confined to the exact details set forth and this application is intended to cover such modifications or departures as may come within the purposes of the improvement and the scope of the following claims.

I claim:
1. Apparatus for converting a frozen beverage from a hard state to a liquid state while confined in a tapered container, comprising a vertically reciprocatory support on which the container is positioned, a fixed hollow plunger including a bottom and a tapered perforate side wall, and a cover separably attached to said support and including a central tapered body portion movable within said perforate wall of the plunger and a sleeve carried by said central body portion and surrounding said tapered perforate wall, said sleeve including a bottom portion engaging the inner surface of the upper portion of said tapered container.

2. Apparatus for converting a frozen beverage from a hard state to a liquid state while confined in a tapered container, comprising a vertically reciprocatory support on which the container is positioned, a hollow plunger including a tapered perforate wall mounted at its lower end on a fixed post and surrounding said post in spaced relation thereto, and a cover separably attached to said support and including a central tapered body portion slidable on said post within said tapered perforate wall and a sleeve carried by said central body portion and surrounding said tapered perforate wall, said sleeve including a bottom portion engaging the inner surface of the upper portion of said tapered container.

3. Apparatus for converting a frozen beverage from a hard state to a liquid state while confined in a tapered paper cup, comprising a tapered container surrounding and conforming to the tapered cup, a vertically reciprocatory support on which the cup and container are positioned, a hollow plunger including a tapered perforate wall mounted at its lower end on a fixed post and surrounding said post in spaced relation thereto, a metal cover separably attached to said support and including a central tapered body portion slidable on said post within said tapered perforate wall, and a sleeve carried by said central portion and surrounding said tapered perforate wall, said sleeve including a bottom portion engaging the inner surface of the upper portion of said tapered cup.

4. Apparatus for converting a frozen beverage from a hard state to a liquid state while confined in a tapered paper cup, comprising a tapered metal container surrounding and conforming to the tapered cup, a vertically reciprocatory support on which the cup and container are positioned, a hollow plunger including a bottom mounted on a fixed post and a tapered perforate side wall spaced from said post, a metal cover separably attached to said support and including a central tapered body portion slidable on said post within said hollow plunger and a cylindrical sleeve threadedly attached to said central body at its upper end and spaced therefrom, the lower end of said sleeve closely embracing the inner surface of the upper edge of said tapered cup.

5. Apparatus for converting a frozen beverage from a hard state to a liquid state while confined in an open top container, comprising a support on which the container is positioned and a post, one of which elements has a vertical reciprocatory movement in relation to the other, a hollow plunger surrounding and spaced from said post and including a perforate wall connected at its lower end to the bottom of the post, and a cover separably attached to said support and container and including an inner portion movable relatively within said perforate wall of the plunger and an outer portion surrounding and spaced from said inner portion and including a bottom portion that engages the upper edge of the container.

6. Apparatus for converting a frozen beverage from a hard state to a liquid state while confined in an open top downwardly tapering container, comprising a support on which the container is positioned and a post, one of said elements having a vertical reciprocatory movement in relation to the other, a hollow plunger surrounding and spaced from said post and including a downwardly tapering perforate wall connected at its lower end to the bottom of the post, and a cover separably attached to said support and container and including a downwardly tapering inner portion movable relatively within said tapered perforate wall of the plunger and an outer portion surrounding and spaced from said inner portion and including a downwardly tapering bottom portion that engages the upper edge of the container.

FRANK WESLEY MOFFETT, Jr.

References Cited in the file of this patent

UNITED STATES PATENTS

| Number | Name | Date |
|---|---|---|
| 168,533 | Smith | Oct. 5, 1875 |
| 541,837 | Critcher et al. | July 2, 1895 |
| 1,604,513 | Hoffer | Oct. 26, 1926 |
| 2,071,879 | Jolma | Feb. 23, 1937 |

FOREIGN PATENTS

| Number | Country | Date |
|---|---|---|
| 10,666 | Great Britain | May 9, 1904 |
| 330,314 | Great Britain | June 12, 1930 |